April 12, 1938. C. SEAMAN 2,113,950
METHOD AND APPARATUS FOR MAKING TRIMMING
Filed Jan. 2, 1937 7 Sheets-Sheet 1

Charles Seaman INVENTOR.
BY Wm. S. Pritchard ATTORNEY.

April 12, 1938.  C. SEAMAN  2,113,950
METHOD AND APPARATUS FOR MAKING TRIMMING
Filed Jan. 2, 1937  7 Sheets-Sheet 2
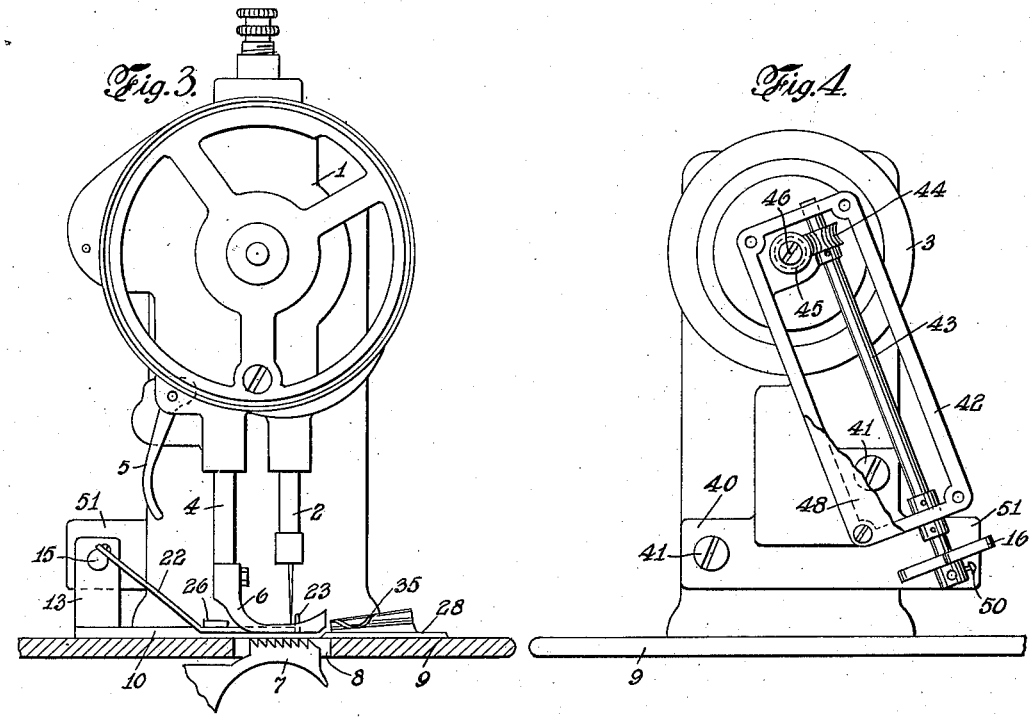
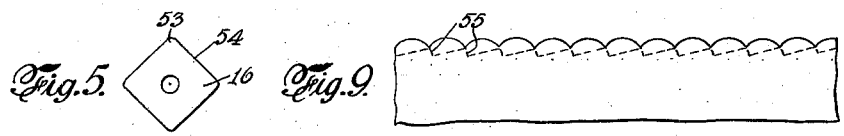
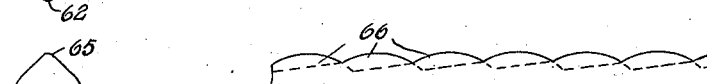
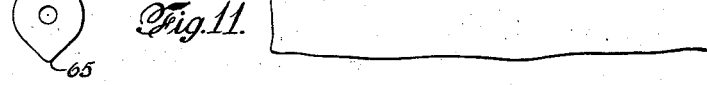
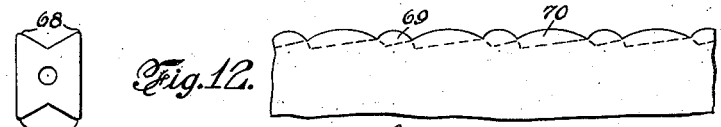
Charles Seaman INVENTOR.
BY Wm. S. Pritchard
ATTORNEY.

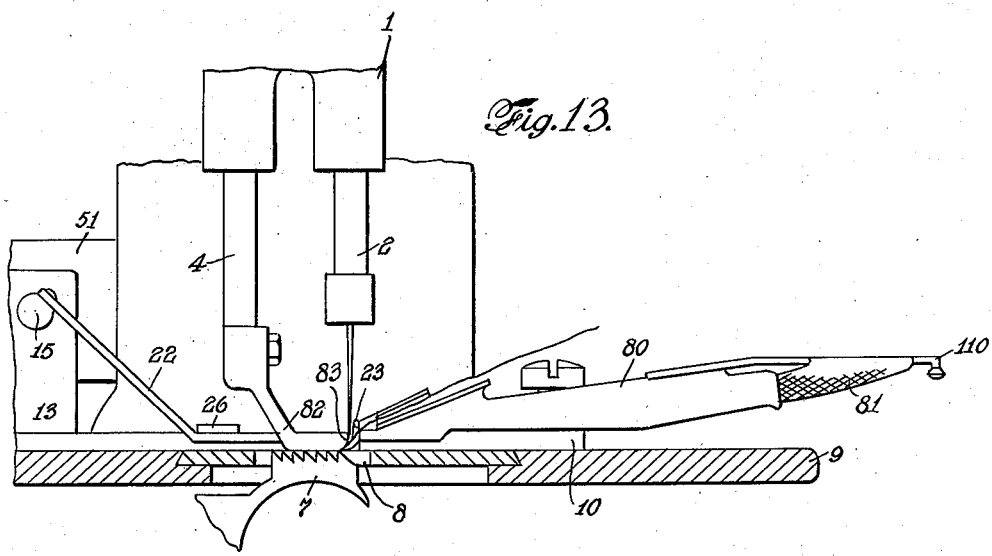
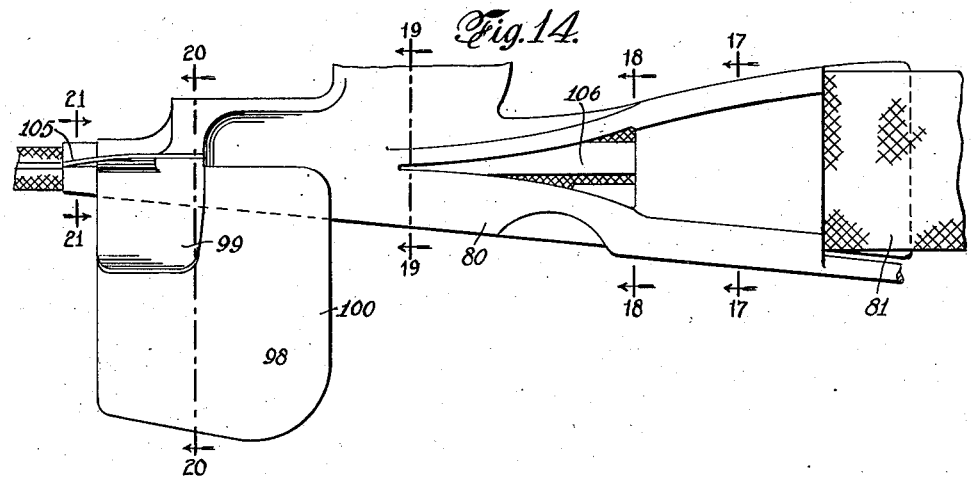
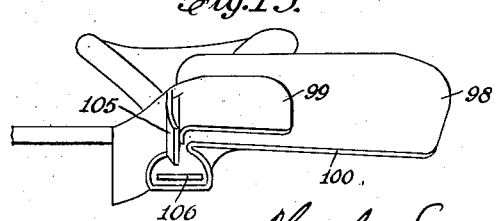

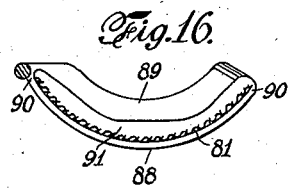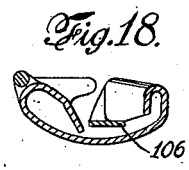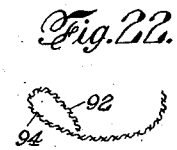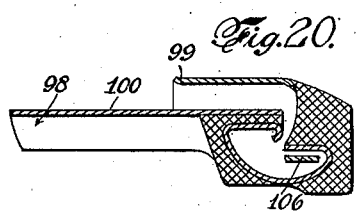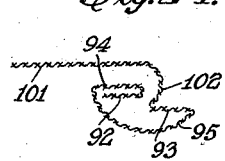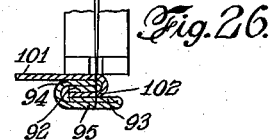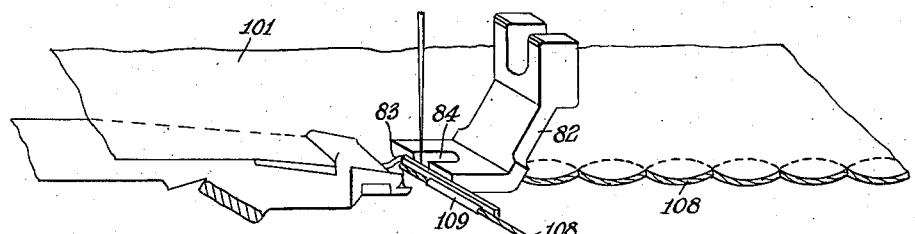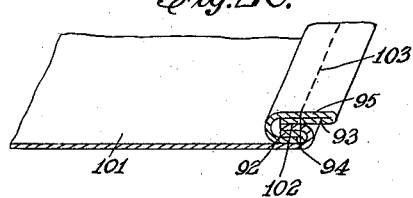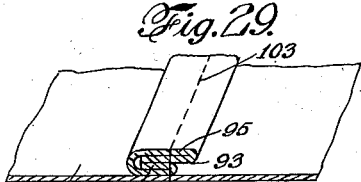

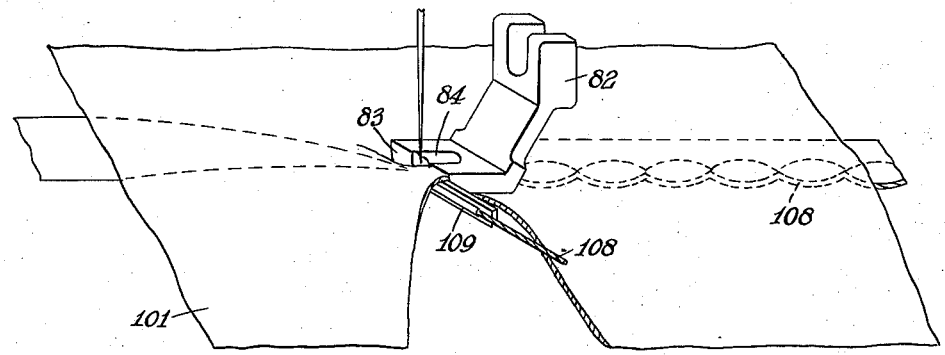
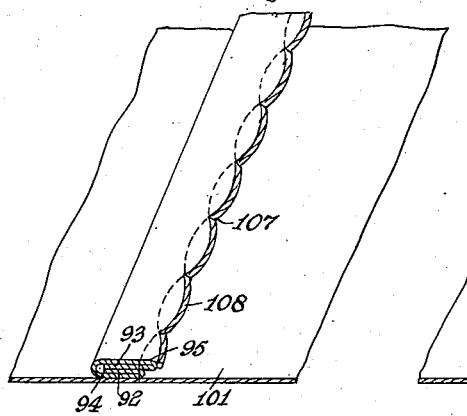
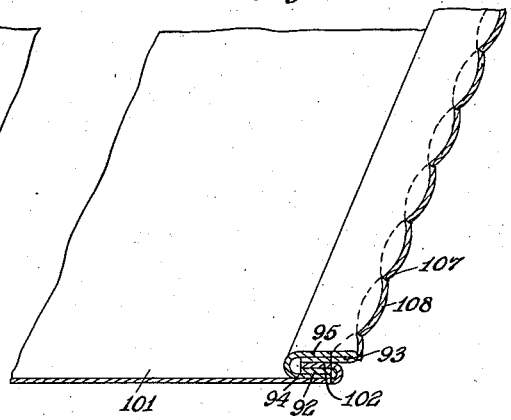
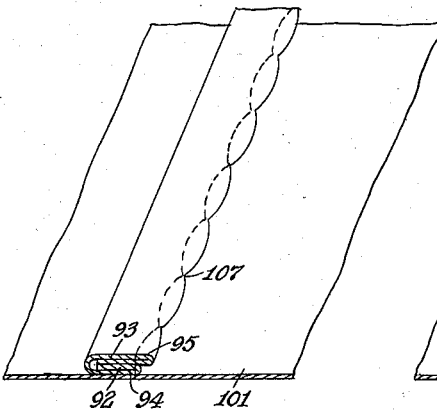
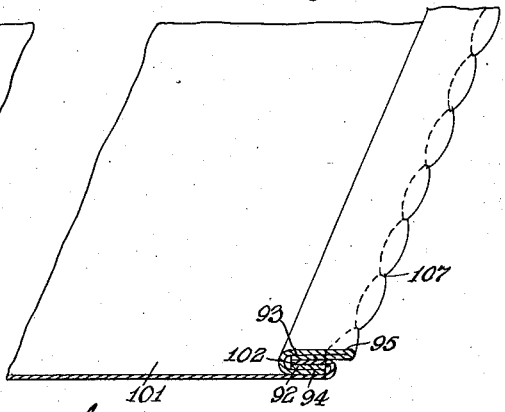

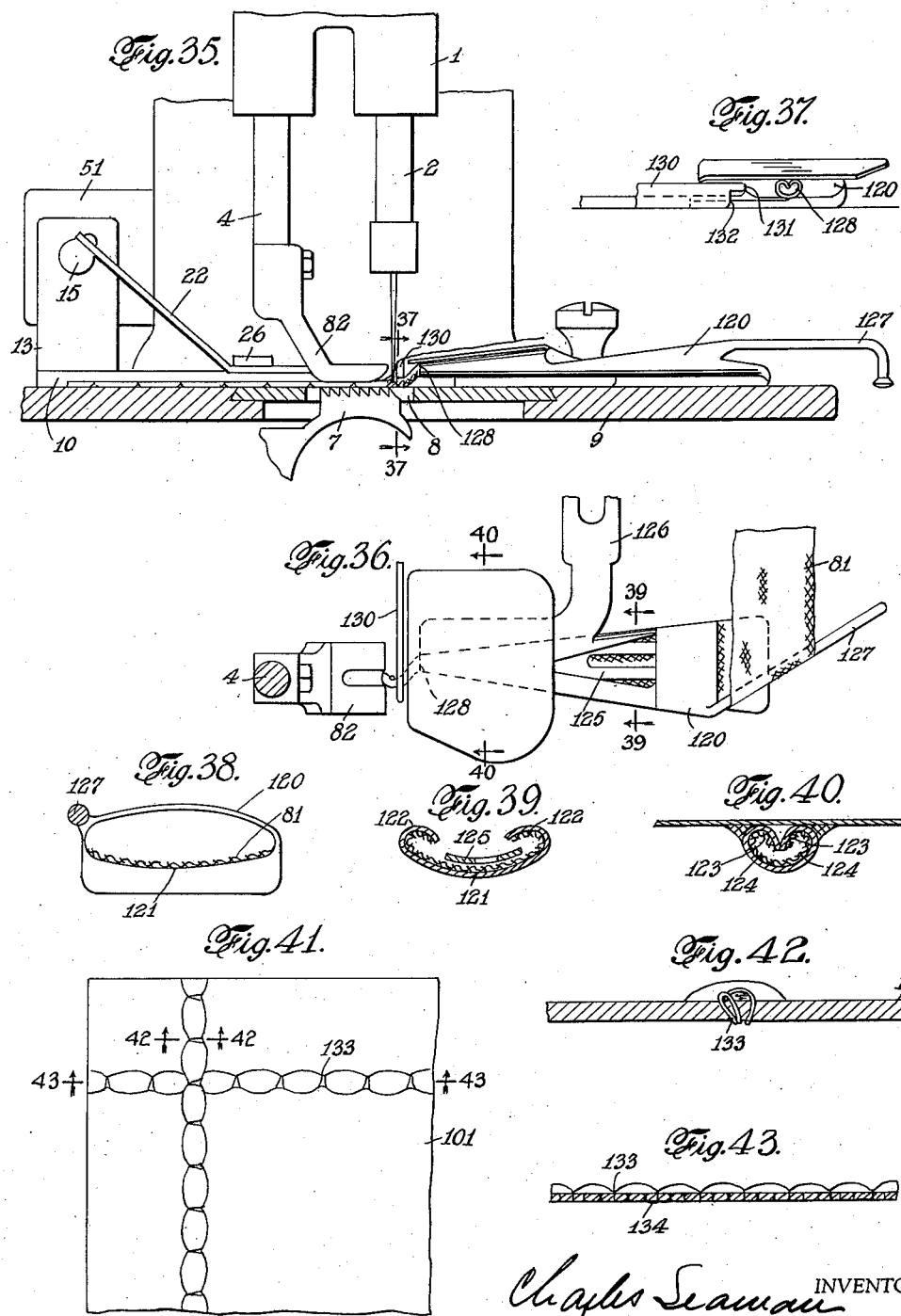

April 12, 1938.   C. SEAMAN   2,113,950
METHOD AND APPARATUS FOR MAKING TRIMMING
Filed Jan. 2, 1937   7 Sheets-Sheet 7
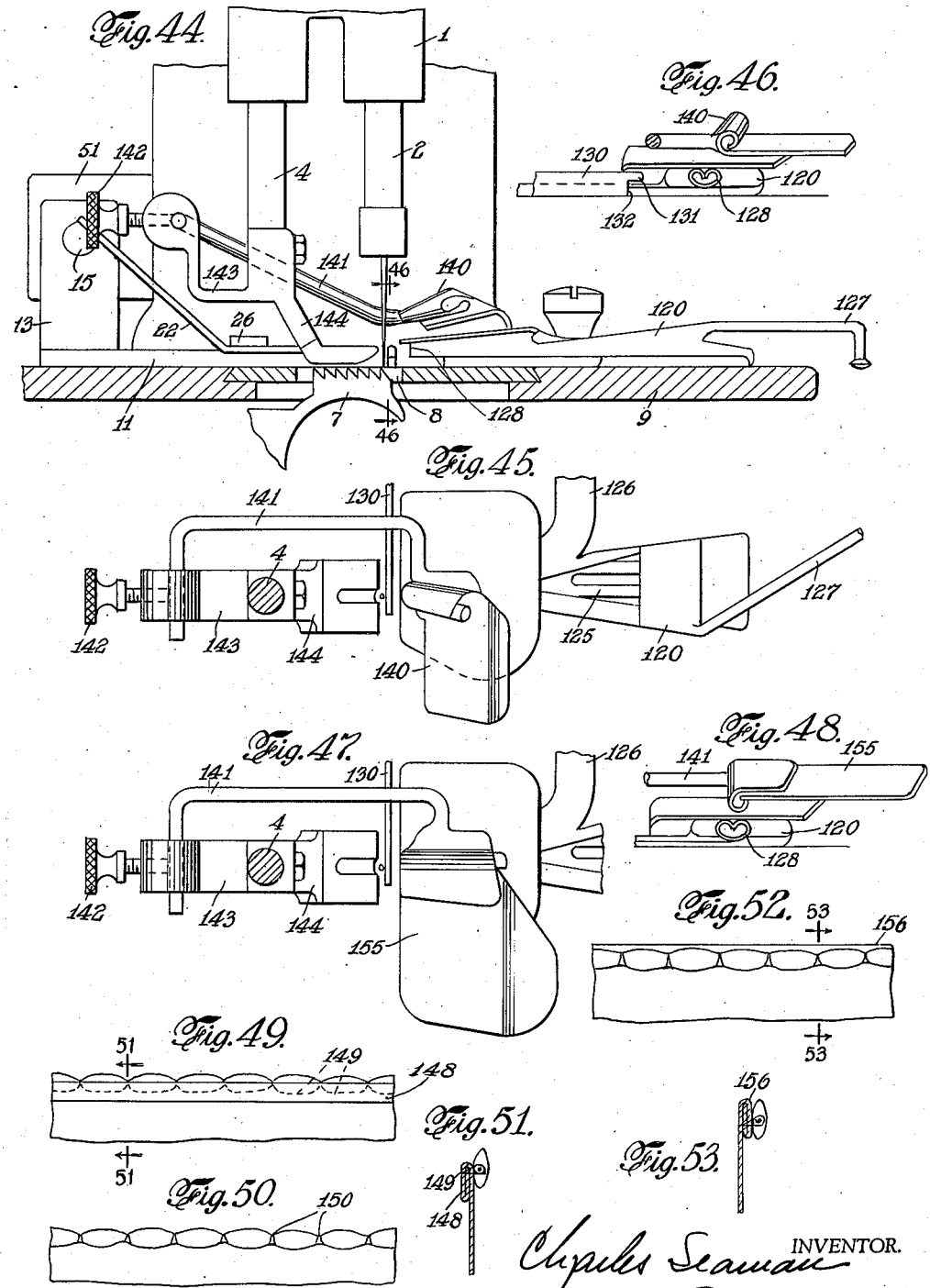

Patented Apr. 12, 1938

2,113,950

UNITED STATES PATENT OFFICE 2,113,950

METHOD AND APPARATUS FOR MAKING TRIMMING

Charles Seaman, Jamaica Estates, N. Y.

Application January 2, 1937, Serial No. 118,848

15 Claims. (Cl. 112—2)

This invention relates to a hem or a trimming having a new and attractive design and to a method and apparatus for making the same.

This invention is an improvement and a further adaptation of the invention disclosed in my copending application Serial No. 44,498 for Scalloping device, filed October 11, 1935, and Serial No. 73,637 for Apparatus and method for making concealed edge trimming, filed April 10, 1936, and this application is in part a continuation of said applications.

An object of the invention is to provide a sewing machine which can be changed by simple adjustments to make finished products having a large number of different designs.

Another object is to provide an attachment for the above purpose which can be readily applied to a standard sewing machine without substantial alteration or modification thereof.

Another object is to provide a trimming which is attached either to the edge or on the face of a fabric to produce various pleasing effects.

Other objects and advantages will be apparent as the nature of the invention is more fully disclosed.

A feature of the invention consists in the provision of a scalloping attachment driven from the pulley on a standard sewing machine head and including a removable and replaceable cam which is connected to actuate a finger which is mounted for transverse movement. The finger engages the edge of the fabric or trimming material adjacent to and in advance of the needle path, so as to shift the same laterally for displacing the stitch with respect thereto and producing a scalloped effect.

Another feature consists in the provision of a set of cams which can be interchanged without otherwise disturbing the mechanism to produce various different regular and irregular scalloped designs.

Another feature consists in the provision of an adjustable and movable folder for the edge of the fabric which is supported by and removable with the attachment.

Another object is to provide a folder for prefolding the trimming and feeding the same to the path of the needle in a position to be engaged by the movable finger for the purpose above mentioned.

Another feature consists in feeding a separate cord to the hem or the edge of the trimming and attaching the same to form a scalloped corded edge.

Another feature consists in feeding the trimming in a path offset with respect to the needle path, so that it normally is not stitched, and periodically shifting the trimming into the path of the needle for stitching, so that it is stitched at predetermined spaced intervals, in which intervals the trimming is free from the fabric and puffs out to form a scalloped effect and to conceal the row of stitches in the fabric.

Another feature consists in folding the edge of a fabric and feeding the same to the needle path in such manner that the trimming is attached to the folded edge.

Another feature consists in the provision of a folder for the above purpose which may be mounted for shifting into an inoperative position or may be removed from the machine to permit the trimming to be attached to the face of the fabric, or to permit the machine to be used for standard sewing operations.

Another feature consists in the provision of a finger having a recess to receive and properly position the trimming or hem.

Another feature consists in the provision of a finger having a guide for a cord incorporated therewith for feeding the cord to the edge of the trimming or hem.

A further feature consists in the provision of an attachment in which the various folders and guides are interchangeable for adapting the device to various types of material and to produce different effects.

Other features consist in the various details of construction and combinations of parts, hereinafter more fully set forth.

Although the novel features which are believed to be characteristic of this invention are pointed out more particularly in the claims appended hereto, the broader aspects of the invention will be better understood by referring to the following description taken in connection with the accompanying drawings in which certain specific embodiments of the invention are set forth.

In the drawings,

Figure 3 is an end elevation of the sewing machine head showing the stitching mechanism;

Figure 4 is an end elevation of the sewing machine head showing the driving mechanism;

Figures 5, 6, 7 and 8 are detail views showing representative types of cams which can be used in this device;

Figures 9, 10, 11 and 12 are detail views illustrating the material produced by the use of the respective cams shown in Figures 5 to 8.

Figure 13 is an end elevation of a portion of a sewing machine head illustrating an embodiment of the invention for making and attaching one type of trimming;

Figure 14 is a top plan view of the folder shown in Figure 13;

Figure 15 is a perspective view of said folder showing the discharge throat;

Figure 16 is an end elevation of the mouth of said folder;

Figures 17, 18, 19, 20 and 21 are sections taken along the lines 17—17, 18—18, 19—19, 20—20, 21—21 respectively of Figure 14, showing the shape of the folder at the different sections thereof;

Figures 22, 23, 24 and 25 are sectional views of the trimming and fabric as they would appear at the sections of the folder shown in Figures 18 to 21 respectively;

Figure 26 is a sectional view of the trimming and fabric at the point of stitching;

Figure 27 is a partial perspective view illustrating one manner in which the materials are fed to the needle for stitching;

Figure 28 is a perspective view of the finished trimming attached at the edge of the fabric, showing the reverse side of the fabric for clearness;

Figure 29 is a perspective view of the trimming attached to the face of the fabric;

Figure 30 is a partial perspective view similar to Figure 27 but showing the method of feeding the materials for attaching the trimming to the face of the fabric;

Figure 31 is a perspective view showing a trimming with a scalloped and corded edge attached to the face of the fabric;

Figure 32 is a perspective view, similar to Figure 28, showing the trimming with a scalloped and corded edge attached at the edge of the fabric and showing the reverse side of the fabric for clearness;

Figure 33 is a perspective view showing the trimming with a scalloped edge attached to the face of the fabric;

Figure 34 is a perspective view, similar to Figure 28, showing the trimming with a scalloped edge attached at the edge of the fabric and showing the reverse side of the fabric for clearness;

Figure 35 is an end elevation of a portion of a sewing machine head illustrating an embodiment of the invention for making and attaching another type of trimming;

Figure 36 is a top plan view of the folder illustrated in Figure 35, showing the offset position thereof with respect to the needle path;

Figure 37 is a section taken along the line 37—37 of Figure 35 showing the discharge throat of the folder;

Figure 38 is an end elevation of the mouth of said folder;

Figures 39 and 40 are sections taken along the lines 39—39, 40—40 of Figure 36, showing the shape of the folder and of the folded trimming at said sections;

Figure 41 is a top plan view of a portion of a fabric showing one form of trimming made in the mechanism illustrated in Figures 35 to 40.

Figure 42 is an enlarged transverse section through the fabric and trimming, taken along the line 42—42 of Figure 41;

Figure 43 is a longitudinal vertical section through the fabric and trimming, taken along the line 43—43 of Figure 41;

Figure 44 is an end elevation of a portion of a sewing machine head, similar to Figure 35, and showing a folder and support therefor for folding the edge of the fabric as it is fed to the needle path;

Figure 45 is a top plan view of the embodiment of the invention shown in Figure 44 illustrating a folder for folding the edge of the fabric upwardly;

Figure 46 is a section taken along the line 46—46 of Figure 44, showing the movable finger and the throats of the folders;

Figure 47 is a top plan view, similar to Figure 45, illustrating a further embodiment of the invention in which the folder is adapted to fold the edge of the fabric downwardly;

Figure 48 is an end elevation showing the throats of the folders illustrated in Figure 47;

Figure 49 is a detail view of the fabric and trimming produced by the mechanism of Figures 44 to 46, showing the top of the fabric as it comes from the machine which is the reverse side of the finished fabric;

Figure 50 is a detail view of said material showing the bottom of the material as it emerges from the machine, which is the face of the material as it appears in use;

Figure 51 is a transverse section through the fabric and trimming, taken along the line 51—51 of Figure 49;

Figure 52 is a detail plan view of the fabric and trimming produced by the mechanism of Figures 47 and 48, showing the bottom of the material as it emerges from the machine, which is the face of the material when in use; and Figure 53 is a transverse section through the fabric and trimming, taken along the line 53—53 of Figure 52.

Figure 1:
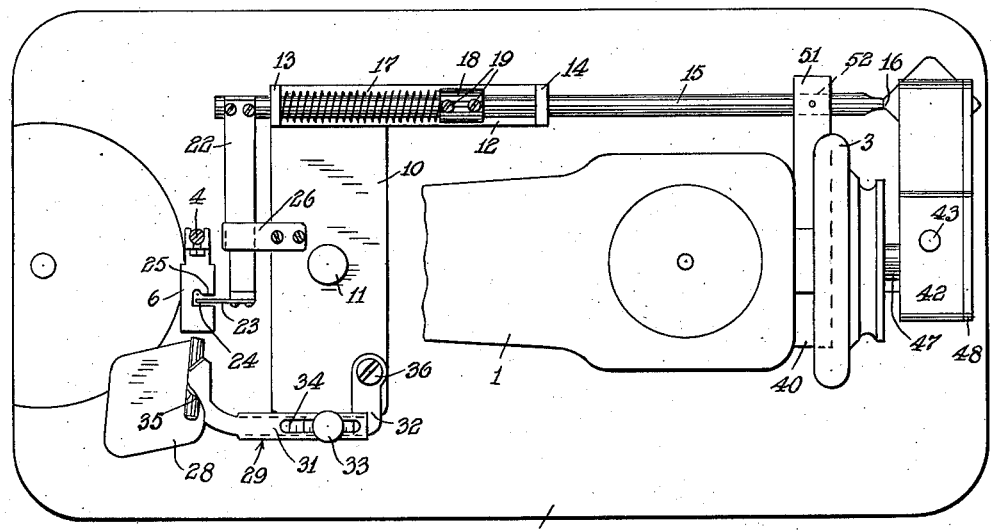
Figure 1 is a top plan view of a portion of a sewing machine head illustrating one embodiment of the present invention.
Figure 2:
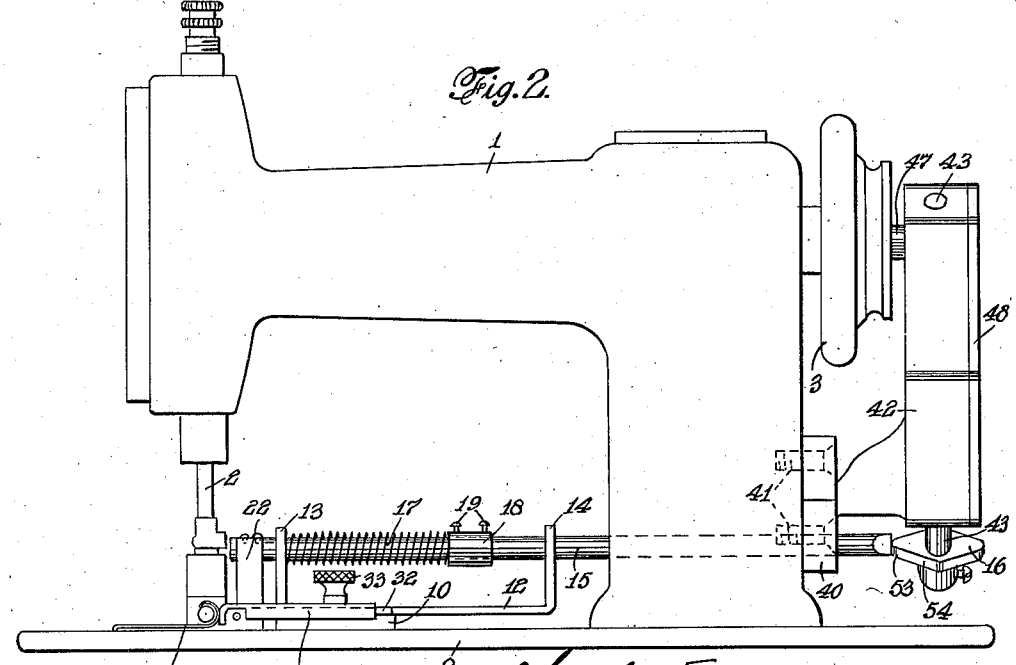
Figure 2 is a front elevation thereof.

In the specification and in the claims certain specific terms have been used for convenience in referring to various details of the invention. These terms, however, are to be given as broad an interpretation as the state of the art will permit.

Referring to the drawings more in detail, the invention is shown in Figures 1 to 4 as embodied in a sewing machine comprising a head 1, having a needle bar 2 which is reciprocated by a suitable driving means, such as a driving shaft (not shown) driven by a pulley 3, and a presser foot bar 4 actuated by a lever 5 and carrying a presser foot 6 which is adapted to maintain the material in engagement with feed dogs 7 extending through an aperture 8 in a base 9.

It is to be understood that the elements thus far referred to are of any standard construction and operate in the usual manner for feeding and stitching a material.

In the embodiment shown, a base plate 10 is provided, which is adapted to be secured to the base 9 of the machine in any convenient manner, as by a set screw 11, which extends through the base plate 10 into a tapped hole in said base 9 and is preferably positioned to engage a tapped hole which is usually present in the base for the purpose of receiving attachments. The base plate 10 is provided with a rear bracket 12 having upstanding ears 13 and 14 through which a rod 15 extends. The rod 15 is normally held against a cam 16, to be described, by means of a coil spring 17, positioned between the ear 13 and a collar 18 which may be secured on the rod 15 in the desired position, as by screws 19. The tension of the spring 17 may be adjusted by varying the position of said collar 18.

The rod 15 carries at its free end an arm 22 to which is secured a transverse finger 23 having an edge 24 adapted to enter a slot 25 in the presser foot 6 for the purpose to be described. In some instances the presser foot may terminate at the needle path, as will be later described, in which case the finger 23 extends past the end of the presser foot. The arm 22 is adapted to slide transversely under a guide 26 which is secured to the base plate 10. This guide could be omitted if the rod 15 is otherwise prevented from turning in the bracket 12. The rod 15 can, for example, be square or rectangular for this purpose.

A folder 28 is provided with an extensible arm 29 which is secured to the base plate 10 by a screw 30. The extensible arm 29 comprises slidable members 31 and 32 which are adjustably secured together by a set screw 33 extending through an elongated slot 34 in the member 31 and threaded into the member 32. The folder 28 is designed to fold a longitudinal edge of the material being stitched to form a plurality of plies and to guide the same to the needle for stitching to form the finished hem. The folder 28 may be provided with a slot 35 through which the edge of the material passes and which is adapted to limit the amount of material which is folded over, whereby a hem of uniform width may be produced. The folder can be mounted in other ways. For example, the arm 29 may be made in one piece and may be mounted directly on the base plate 10 by a set screw cooperating with an elongated slot in said arm or in the base plate. The folder may be omitted and a guide substituted therefor if the edge of the material is not to be folded over.

The driving mechanism for the cam 16 comprises a bracket 40 which is secured to the end of the sewing machine head 1 by means of screws 41. The bracket 40 carries a housing 42 in which a shaft 43 is journaled, carrying the cam 16 and a worm gear 44. A cooperating worm gear 45 is secured by suitable means in driving relationship to the driving shaft of the machine. In one embodiment, the worm gear 45 is secured by a screw 46 to a bushing (not shown) which extends through a suitable opening in the housing 42 and is secured in the hub 47 of the pulley 3 in driving relationship to said driving shaft. A cover plate 48 may be secured to the housing 42 to conceal the above-described driving mechanism.

The cam 16 may be secured to the shaft 43 by means of a set screw 50. The bracket 40 is also provided with an extension 51 having an aperture 52 through which the rod 15 extends and which is adapted to hold the end of said rod in alignment with the cam 16. The driving mechanism can be mounted in other ways as on the base 9 if it is built in the machine. The bracket 40 as shown is particularly convenient when used as an attachment as it supports all of the parts and is easily installed.

In the operation of the device thus far described, the edge of the material is folded over by the folder 28 to form a plurality of plies adapted to make a hem having two or more thicknesses, and is discharged in a position for receiving a row of stitches by which the hem is secured in the usual manner. The rotation of the driving pulley 3, however, causes the cam 16 to be rotated at a speed which is determined by the ratio of the gears 44 and 45. As a point 53 of this cam 16 engages the end of the rod 15, the rod is shifted axially, thereby causing the arm 22 and the finger 23 to be shifted transversely. The edge 24 of the finger 23 enters the slot 25 in the presser foot 6 and reaches a position closely adjacent but in advance of the path of travel of the needle. When a low part 54 of the cam 16 has turned toward the end of the rod 15, the rod is permitted to move in the reverse direction under the influence of the spring 17, whereby the edge 24 of the finger 23 is retracted from the slot 25.

When the edge 24 is out of engagement with the material being stitched, the machine operates in the usual manner to form a hem on the edge of said material. However, when the edge 24 has been brought into engagement with said material due to the action of the cam 16, it shifts the edge of the material transversely an amount such that one or more stitches, such as a stitch 55 (Figure 9), extends over said edge. The stitch 55 prevents the adjacent material from returning to its original position when the finger 23 is disengaged therefrom, whereby a scalloped effect is produced in the finished material.

The cam 16 is so designed and so timed, as by suitable adjustment on the shaft 43, that the edge 24 of the finger 23 engages the edge of the material being stitched and shifts the same at the time of the penetrating thrust of the needle but releases the material as soon as the stitch has been formed, so that the stitching can progress normally until the finger 23 again engages the material.

The length of the scallop and the general appearance can be varied by varying the shape of the cam 16. In Figures 1 to 5, the cam is illustrated as of generally square contour and is adapted to produce four strokes of the rod 15 for each revolution of the cam. The number of stitches intervening between the successive strokes is dependent upon the gear ratio of the driving gears 44 and 45 and of the mechanism driving the reciprocating needle. The scallop can be lengthened by lengthening the stitch of the machine so that a greater amount of material is fed between successive strokes of the rod 15.

It is obvious that various other types of cams can be used to produce different effects as, for example, the cams illustrated in Figures 6, 7 and 8. The cam in Figure 6 is provided with three points 60, 61 and 62 which are irregularly spaced so as to provide a long scallop 63 (Figure 10) and two intermediate shorter scallops 64. The cam illustrated in Figure 7 is provided with a pair of points 65 which are adapted to actuate the rod 15 twice during each revolution of the cam so as to produce a scallop 66 (Figure 11) which is double the length of the scallop shown in Figure 9 produced by the four-pointed cam of Figure 5.

The cam of Figure 8 is provided with points 68 which are irregularly spaced around the periphery so as to actuate the rod twice in rapid succession to produce the shorter scallops 69 (Figure 12) and to alternately provide a somewhat longer interval between such actuations so as to produce longer scallops 70 of Figure 12. This form of cam accordingly produces alternate long and short scallops.

It is obvious that various other arrangements can be obtained by varying the shape of the cam and the timing thereof with respect to the needle. Certain specific forms have been shown for purposes of illustration only.

It is to be noted that the above-described device can be attached to any standard type of sewing machine with a minimum amount of labor.

This is accomplished by first attaching the bracket 40 containing the driving mechanism and connecting the gear 45 to the driving shaft of the machine. Thereafter, the base plate 10 may be positioned by first inserting the end of the rod 15 in the aperture 52 in the extension 51 of the bracket 40. The proper timing is obtained by moving the pulley 3 until the needle is in the lowest position and then setting the cam 16 with one of its points 53 against the rod 15. Thereafter, the proper timing is assured inasmuch as the various points of the cam 16 are designed to actuate the rod 15 in synchronism with the needle.

If it is desired to use the machine for ordinary sewing, it is only necessary to remove the set screw 11 and to remove the base plate 10, together with the folder 28, the rod 15 and associated mechanism, from the machine. The cam 16 and the associated driving mechanism need not be removed inasmuch as they will not interfere with the normal operation of the machine.

The finger 23 has been shown as arranged to shift the edge of the material transversely a sufficient distance to cause the stitch to extend over the edge. The throw of the rod 15 and the transverse movement of the finger 23 may be varied somewhat, however, so as to vary the position of the stitch with respect to the edge of the material and still maintain the salient characteristic of the finished product. The stitch may, for example, extend to a point near the edge of the material without extending entirely thereover.

Figures 13 to 34 illustrate an embodiment of the invention for making a type of trimming and attaching the same either at the edge or on the face of the material. In one form the trimming is made with a straight edge, in another form the edge is scalloped, and in a third form a cord is attached at the scalloped edge of the trimming.

In this embodiment, the sewing machine head and associated mechanism, the finger 23 and the driving means therefor are similar to the parts shown in Figures 1–4. The folder 28 or Figure 1 is removed, however, from the base plate 10 and in place thereof a folder 80 for the trimming material 81 is substituted. This folder 80 is mounted in the same manner as the folder 28 by an adjustable arm (not shown).

Instead of the presser foot 6 of Figure 1, a presser foot 82 is used, having an edge 83 at about the path of the needle, and a recess 84 therein to receive the needle.

The folder 80, as illustrated more in detail in Figures 14 to 21 inclusive, may be made of sheet metal which is bent to form a bottom 88, top 89, and sides 90 (Figure 16) having a concave channel 91 therebetween which is adapted to receive the trimming 81. In successive sections from the mouth to the throat of the folder, illustrated in Figures 16 to 21 respectively, the sides 90 are bent over in an increasing roll so as to fold the trimming material 81 about its longitudinal axis into a general U-shape with the edges folded over inwardly to form two plies on each side.

The approximate position of the trimming 81 at the various sections of the folder is illustrated in Figures 22 to 25. It will be noted that the trimming 81 is bent into slightly concave form at the mouth of the folder, as illustrated in Figures 16 and 17, and that as it proceeds through the folder the two edges of the trimming are bent over on the inside to form inner plies 92 and 93 and outer plies 94 and 95. As the trimming is discharged from the throat of the folder, the two inner plies 92 and 93 are disposed adjacent each other between the folds formed by the outer plies 94 and 95.

A fabric guide 98 is mounted on the folder near the throat thereof, as indicated in Figures 14, 15 and 20. This fabric guide comprises upper and lower members 99 and 100 respectively, which are adapted to guide a fabric 101 and to fold the edge of the fabric downwardly to form a ply 102 between the inner plies 92 and 93 of the trimming. As the fabric and trimming emerge from the throat of the folder, they are in the form illustrated in Figure 25, with the ply 102 of the fabric 101 folded downwardly against the inner ply 92 of the trimming. As the fabric and trimming together pass under the presser foot, they are folded downwardly, as shown in Figure 26, with the ply 102 of the fabric secured between the adjacent inner plies 92 and 93 of the trimming and with the fabric lying flat over the outer ply 94 of the trimming. In this relative position, the fabric and trimming are passed under the needle in a position to receive a stitch 103 (Figure 28) which extends through the face of the fabric 101 and through various plies above mentioned and attaches the trimming to the fabric at the edge thereof and with the various raw edges, both of the trimming and of the fabric, folded in and concealed between the outer plies of the trimming. It is to be understood that the needle is held in the needle bar 2 and cooperates with the various other parts of the sewing machine (not shown) to form the stitch 103 in the usual manner.

A spring finger 105 is carried by the folder 80 adjacent the throat thereof and serves to hold the ply 102 of the fabric 101 and the adjacent plies 92 and 94 of the trimming in their proper positions as they are discharged from the throat of the folder. A guide plate 106 is also carried in the folder for properly positioning the trimming therein. It is to be understood that the parts of the folder may be secured in any suitable manner, as by solder, and that the particular shape thereof may be varied so as to effect the desired fold in the material.

It is obvious that, if a wider trimming is used, the edges will be rolled over to form more than two plies, and the invention is accordingly not limited to the use of two plies. It is also obvious that a filler (not shown) may be fed in between the folds of the trimming if a puffed effect is desired.

The mechanism above described provides a concealed edge trimming which is secured at the edge of the fabric, as illustrated in Figure 28, with the plies 93 and 95 extending past the edge of the fabric and being visible from the face or front side of the fabric as an edging which may be of a contrasting color.

In certain instances a scalloped or purled edge trimming may be desired. This may be readily made in accordance with the present invention by using the finger 23 above described. The finger 23 engages the edge of the material adjacent the path of the needle and shifts said edge in a transverse direction a sufficient distance to cause a stitch 107 to extend entirely over the edge, as shown in Figure 34. The movement of the finger 23 may be adjusted so as to cause the stitch to extend entirely over the edge or to cause the stitch to be displaced from its normal path by any desired amount. In this way, a scalloping having any desired characteristic may be obtained.

In a further embodiment of the present invention, a cord 108 may be attached to the trimming at the edge thereof (Figures 27 and 32). For this purpose, the finger 23 is provided with a guide 109 which is adapted to guide the cord 108 around the edge 24 of the finger 23. The guide 109 may comprise a cylindrical tube through which the cord 108 feeds and which may be located on the front of the finger 23 so that the cord 108 feeds around the edge of the finger and under the presser foot 82. As the fabric and trimming are fed to the needle, the cord 108 is also fed along the edge of the trimming. The adjustment between the parts is such that the material and cord are shifted laterally by operation of the finger 23 a sufficient amount to cause the stitch 107 to extend over the edge of the trimming and over the cord 108 at each actuation of the finger. The trimming, having a scalloped corded edge formed in the above manner, is illustrated in Figure 32. It is to be understood that the cord 108 and the trimming 81 may be fed in any convenient manner. The cord 108, for example, may be held on a spool (not shown) and fed across the base of the machine. The trimming 81 may be held and fed in a similar manner. A guide wire 110 may be attached to the folder 80 to guide the trimming into the mouth of the folder.

In the above-described device, the folder 80 may be adjusted laterally so as to properly position the trimming with respect to the fabric. By altering this adjustment or by changing the position of the fabric with respect to the fabric guide 98, the amount of the ply 102 which is folded in between the folds of the trimming may be varied as desired. Obviously, the edge of the fabric may be prefolded to form more than one ply, or, in some instances, the fabric may be so fed that the edge is disposed at the top of the trimming instead of being folded between the plies thereof.

It is to be understood that the reverse side of the fabric is shown in Figures 28, 32 and 34 for clearness. This side is at the bottom while the trimming is being attached in the sewing machine and is also the concealed side during use. As viewed from the front or exposed face, the trimming is only visible as a narrow edging which projects slightly beyond the edge of the fabric.

In some instances, it may be desirable to attach the trimming to the face of the fabric instead of to the edge thereof. This may be readily accomplished, as illustrated in Figure 30, by feeding the trimming 81 to the needle in the manner above mentioned but by allowing the fabric 101 to extend entirely across the top of the folder 80, as indicated in Figure 30, instead of feeding the edge of the fabric into the fabric guide 98. In this way, the trimming may be disposed in any desired location with respect to the edge of the fabric. A trimming applied in this manner is illustrated in Figure 29, which shows the raw edges of the trimming folded in and concealed and the trimming secured to the fabric 101 by means of a single row of stitches 103.

If it is desired to produce a scalloped or purled edge on this trimming, the fabric 101 is fed over the finger 23 and under the presser foot 82, as shown in Figure 30, so that the finger 23 reciprocates under the fabric 101 and engages the edge of the trimming 81 without interfering with the normal fabric feed. A trimming made in this manner is illustrated in Figure 33, which is similar to that shown in Figure 34, except that the trimming is applied to the face of the fabric instead of to the edge thereof.

A corded edge may also be applied to this type of trimming by using the guide 109 on the finger 23 and feeding the cord 108 therethrough so that the cord is caused to lie along the edge of the trimming and be attached thereto by the spaced stitches 107, as indicated in Figure 31. This type of trimming is made similar to that shown in Figure 32, with the exception that the trimming is applied to the face of the fabric instead of at the edge.

In Figures 29, 32 and 34, the exposed or top face of the fabric is shown. This face is at the bottom while the trimming is being attached in the sewing machine but constitutes the front or exposed face during use.

It is to be understood that other cams may be used with this trimming attachment to produce different effects similar to those illustrated in Figures 9 to 12 for a scalloped hem. The scallops in the trimming may thus be made irregular in length. The trimming may be attached to the face of the fabric in any design, such as a monogram, by changing the direction of feed of the fabric while otherwise feeding the material as shown in Figure 30.

Figures 35 to 38 illustrate a modification of the invention for making another type of trimming in which the two edges of the trimming are folded over equally to provide a plurality of plies of equal length on both sides of the trimming which are arranged so that the raw edges are concealed by the finished trimming and a puffed effect is produced between the stitches in the manner to be described.

In this embodiment, the sewing machine head and associated mechanism are similar to those shown in Figures 1 to 4. The folder is of the general type illustrated in Figures 13 to 15 and is arranged so that the trimming can be applied to the face of the material in the manner shown in Figure 30. The folder, however, is different in detail construction, as will be described.

Referring now to Figures 35 to 40, the folder 120 is shown as provided with a curved bottom section 121 and is bent upwardly on the sides, as at 122 (Figure 39), to infold the edges of the trimming as it passes therethrough. The trimming, in progressing from the mouth of the folder (Figure 38) to the throat thereof (Figure 37), is progressively folded over into general U-shape with inner plies 123 held between the outer plies 124 and concealed thereby. A guide member 125 is arranged longitudinally of the folder to guide and control the trimming in its pasage therethrough.

The folder 120 is provided with an arm 126 which corresponds to the arm 29 of the folder 28 and is attached to the base plate 10 in the same manner. A guide wire 127 may be used to guide the trimming material 81 to the folder.

Referring to Figure 36, it will be noted that the folder 120 is positioned to discharge the folded binding at the throat 128 thereof, in a path which is offset to the path of the needle an amount such that the needle does not normally pass through the trimming, but instead forms a row of stitches in the fabric 101.

In order to shift the trimming into the path of the needle, a finger 130 is provided, which is similar in general to the finger 23 shown in Figures 1 to 4, and is mounted for actuation in the same way. This finger 130, however, is formed with a lip 131 (Figure 37) which extends beyond the edge 132 thereof and is adapted to pass over and properly position the trimming material so that the material seats in the shoulder formed between this lip 131 and the edge 132.

This finger 130 is arranged so that it periodically engages the trimming 81 as it emerges from the throat 128 of the folder and shifts the same laterally across the path of the needle so that it is secured to the fabric by a stitch, indicated as a stitch 133 in Figures 41–43, which loops over the trimming without passing therethrough or which passes through the trimming according to the adjustment of the motion of the finger 130. Between the spaced stitches 133, and while the trimming is being fed out of alignment with the path of the needle, a row of stitches 134 (Figure 43) is formed in the material 101. It is to be noted, however, that the finished trimming lies over and conceals this row of stitches 134 and puffs out between the stitches 133 to produce a puffed, scalloped effect.

This type of trimming may be applied to the face of the material 101 in any shape or configuration. It may, for example, be used near the border, as for example, on a blanket, to give the effect illustrated in Figure 41. It may also be placed on the material 101 in any irregular design and, of course, more than one row thereof may be used if desired. For example, two or more parallel rows of such trimming may be positioned near the border of the material. It is also to be understood that the appearance of the trimming may be varied by changing the shape of the folder 120 so as to fold in a greater or less amount of the trimming material. Any desired number of plies may be folded in or a filler may be incorporated in the trimming by feeding the same into the folder above the trimming material 81 so as to produce an increased puffiness.

Additional effects may also be obtained by using different types of cams; for example, any of the cams shown in Figures 5 to 8, in which case various regular or irregular scalloped effects, such as those illustrated in Figures 9 to 12, may be obtained.

A further embodiment of the invention is shown in Figures 44 to 48 in which the folder 120, sewing machine head and associated parts are similar to those described. In this embodiment, however, an additional folder 140 is provided which is adapted to receive the edge of the fabric 101 and to fold the same upwardly so as to form a hem thereon. The folder 140 is mounted by means of an arm 141 which is secured by means of a set screw 142 to a bracket 143 which is formed as a part of the presser foot 144. The presser foot 144 is otherwise similar to the presser foot 82 above described.

The mounting for the folder 140 is such that it may be readily adjusted transversely and vertically and held in the desired position by means of the set screw 142. It may also be swung upwardly out of the path of the material or may be removed from the bracket whenever it is desired not to use the same. The folder 140 is positioned, as shown in Figure 45 to discharge the folded hem in the path of the needle. The folder 120, however, is offset with respect to the needle path, as shown in Figure 36, so that the folded trimming is only stitched when it is shifted into the path of the needle by the finger 130 above described.

The product made by this embodiment of the invention is illustrated in Figures 49 to 51. It is to be noted that the hem 148 (Figure 49) is stitched by a row of stitches 149, but that only certain stitches 150 of said row extend over and engage the trimming. Figure 49 shows the reverse side of the material, which is the top side as it comes out of the machine. It is to be noted that the trimming appears at the edge of the material and from the face thereof conceals the row of stitches 149, as illustrated in Figure 50. The folder 140 may, of course, be designed to fold any number of plies of material, or if the trimming is to be applied to the edge of thick material, such as a blanket, the folder 140 may be replaced by a guide, in which case the trimming would appear similar to that above described except that the hem 148 would be replaced by the single thickness of material at the edge of the fabric.

A further embodiment of the invention is shown in Figure 47 in which the parts are similar to those shown in Figures 44 and 45 with the exception of the folder 155. This folder 155 replaces the folder 140 of Figure 45 and is adapted to fold the edge of the material downwardly to form a turned under hem 156 (Figure 53) and to discharge the same in the path of the needle for stitching.

In this embodiment, the trimming appears on the side of the hem and either completely or partially conceals the same in the finished product. This embodiment differs from that shown in Figures 49 to 51 in that the reverse side of the material is smooth, whereas the reverse side of the material in Figures 49 to 51 shows the inturned hem.

It is obvious that various other changes and modifications may be made to produce different designs and effects or that any of the folders are interchangeable and may be used with different types of cams and with different feeds, as desired.

A corded edge may be applied to the trimming illustrated in Figures 41, 49 and 52 by passing the cord 108 around the finger 130 in the manner illustrated in Figures 27 and 30.

The entire device may be readily applied to a machine as an attachment without substantial change or alteration in the machine. When it is not desired to use the scalloping mechanism, the attachment may be removed from the machine as a unit, inasmuch as the various folders, as well as the transverse finger, are supported on the base plate 10. The folders 140 and 155 of Figures 44 and 47 may also be mounted on the base plate 10, if desired. By mounting these folders on the bracket 143, however, they are prevented from interfering with the material 101 since the folder can be readily detached or swung into an inoperative position, as desired.

In the case of a built-in machine as distinguished from an attachment, the folders may be mounted directly on the base 9 or head 1, and the cam may be driven from the usual transverse drive shaft beneath the base 9, such as the shaft for driving the bobbin or the feed dogs 7.

Although certain representative embodiments of the invention have been described in detail, it is evident that the invention is capable of various uses and may be adapted to produce a large number of designs and effects. Various changes and modifications may be made therein, as will appear to a person skilled in the art. Hence, the invention is only to be limited in accordance with the scope of the following claims when interpreted in view of the prior art.

I claim:

1. In a sewing machine, a reciprocating needle, means to feed a fabric past the path of the needle to receive a row of stitches, a folder formed to fold a trimming material about its longitudinal axis into general U-shape with the edges folded inwardly to form at least two plies on each side, said folder being positioned to feed the trimming with the fabric in a path offset with respect to the needle path whereby the stitch normally does not penetrate the trimming, and means to periodically shift the folded trimming into the path of the needle whereby the trimming is secured to said fabric at spaced intervals by a plurality of spaced stitches between which it is free to puff out to form a scalloped effect and conceal the row of stitches in the fabric.

2. In a sewing machine, a reciprocating needle, means to feed a fabric past the path of the needle to receive a row of stitches, a folder formed to fold a trimming material about its longitudinal axis into general U-shape with the edges folded inwardly to form at least two plies on each side, said folder being positioned to feed the trimming with the fabric in a path offset with respect to the needle path whereby the stitch normally does not penetrate the trimming, and a finger engaging the edge of the trimming adjacent and ahead of the path of the needle, said finger being movable transversely of the path of feed of the trimming to shift the same across the path of the needle so the trimming is secured to said fabric at spaced intervals by a plurality of spaced stitches between which it is free to puff out to produce a scalloped effect and conceal the row of stitches in the fabric.

3. In a sewing machine, a reciprocating needle, means to feed a fabric past the path of the needle, a folder formed to fold the edge of said fabric over to form two plies, means to feed said folded edge to the path of the needle in a position to secure said plies with a single row of stitches, a second folder formed to fold a trimming material about its longitudinal axis into general U-shape with the edges folded inwardly to form at least two plies on each side, said second folder being positioned to feed the folded trimming with the fabric in a path offset with respect to the path of the needle whereby the stitch normally does not extend through said trimming, and means to periodically shift said folded trimming into the path of the needle to receive a stitch whereby the trimming is secured to said fabric at spaced intervals by a plurality of spaced stitches between which it is free to puff out in a scalloped effect and conceal the row of stitches in the fabric.

4. In a sewing machine, a reciprocating needle, means to feed a fabric past the path of the needle, a folder formed to fold the edge of said fabric upwardly to form two plies, means to feed said folded edge to the path of the needle in a position to secure said plies with a single row of stitches, a second folder formed to fold a trimming material about its longitudinal axis into general U-shape with the edges folded inwardly to form at least two plies on each side, said second folder being positioned to feed the folded trimming under the fabric in a path offset with respect to the path of the needle whereby the stitch normally does not extend through said trimming, and means to periodically shift said folded trimming into the path of the needle to receive a stitch whereby the trimming is secured to said fabric at spaced intervals by a plurality of spaced stitches between which it is free to puff out in a scalloped effect and conceal the row of stitches in the fabric.

5. In a sewing machine, a reciprocating needle, means to feed a fabric past the path of the needle, a folder formed to fold the edge of said fabric downwardly to form two plies, means to feed said folded edge to the path of the needle in a position to secure said plies with a single row of stitches, a second folder formed to fold a trimming material about its longitudinal axis into general U-shape with the edges folded inwardly to form two plies on each side, said second folder being positioned to feed the folded trimming under the fabric in a path offset with respect to the path of the needle whereby the stitch normally does not extend through said trimming, and means to periodically shift said folded trimming into the path of the needle to receive a stitch whereby the trimming is secured to said fabric at spaced intervals by a plurality of spaced stitches between which it is free to puff out in a scalloped effect and conceal the row of stitches in the fabric.

6. An attachment for a sewing machine having a reciprocating needle and means to feed a fabric past the path of the needle for stitching, said attachment comprising a folder formed to fold a trimming material about its longitudinal axis into general U-shape with the edges folded inwardly to form two plies on each side, said folder being positioned to feed the trimming with the fabric in a path offset with respect to the needle path whereby the stitch normally does not penetrate the trimming, and a finger engaging the edge of the trimming adjacent and ahead of the path of the needle, said finger being movable transversely of the path of feed of the trimming to shift the same across the path of the needle so the trimming is secured to said fabric at spaced intervals by a plurality of spaced stitches between which it is free to puff out to produce a scalloped effect and to conceal the row of stitches in the fabric.

7. An attachment for a sewing machine having a reciprocating needle and means to feed a fabric past the path of the needle for stitching, said attachment comprising a folder formed to fold the edge of said fabric over to form two plies, means to feed said folded edge to the path of the needle in a position to secure said plies with a single row of stitches, a second folder formed to fold a trimming material about its longitudinal axis into general U-shape with the edges folded inwardly to form two plies on each side, said second folder being positioned to feed the folded trimming with the fabric in a path offset with respect to the path of the needle whereby the stitch normally does not extend through said trimming, and means to periodically shift said folded trimming into the path of the needle whereby the trimming is secured to said fabric at spaced intervals by a plurality of spaced stitches between which it is free to puff out in a scalloped effect and conceal the row of stitches in the fabric.

8. An attachment for a sewing machine having a reciprocating needle and means to feed a fabric past the path of the needle for stitching, said attachment comprising a folder formed to fold the edge of said fabric upwardly to form two plies, means to feed said folded edge to the path of the needle in a position to secure said plies with a single row of stitches, a second folder formed to fold a trimming material about its longitudinal axis into general U-shape with the edges folded inwardly to form two plies on each side, said second folder being positioned to feed the folded trimming under the fabric in a path offset with respect to the path of the needle whereby the stitch normally does not extend through said trimming, and means to periodically shift said folded trimming into the path of the needle whereby the trimming is secured to said fabric at spaced intervals by a plurality of spaced stitches between which it is free to puff out in a scalloped effect and conceal the row of stitches in the fabric.

9. An attachment for a sewing machine having a reciprocating needle and means to feed a fabric past the path of the needle for stitching, said attachment comprising a folder formed to fold the edge of said fabric downwardly to form two plies, means to feed said folded edge to the path of the needle in a position to secure said plies with a single row of stitches, a second folder formed to fold a trimming material about its longitudinal axis into general U-shape with the edges folded inwardly to form two plies on each side, said second folder being positioned to feed the folded trimming under the fabric in a path offset with respect to the path of the needle whereby the stitch normally does not extend through said trimming, and means to periodically shift said folded trimming into the path of the needle whereby the trimming is secured to said fabric at spaced intervals by a plurality of spaced stitches between which it is free to puff out in a scalloped effect and conceal the row of stitches in the fabric.

10. A method of making a trimmed fabric which comprises feeding a fabric to a needle in a position to receive a single row of stitches, folding a trimming material about its longitudinal axis into general U-shape with the edges folded inwardly to form at least two plies on each side, feeding the folded trimming with the fabric in a path offset with respect to the needle path, and periodically shifting said folded trimming across the needle path so as to cause spaced stitches of said row to secure said trimming to said fabric, whereby the trimming is free to puff out between said spaced stitches to conceal said row of stitches and to produce a scalloped effect.

11. In a sewing machine a reciprocating needle, means including a presser foot to feed a fabric past the path of the needle, a folder formed to fold the edge of said fabric to form two plies, a bracket formed on said presser foot, an arm carrying said folder and pivotally mounted in said bracket for positioning said folder to feed the folded edge of the fabric to the needle in position to receive a row of stitches and to be pivotally swung out of said position when said folder is not to be used, means to feed said folded edge to the path of the needle in a position to secure said plies with a single row of stitches, means to feed a trimming material with the fabric in a path offset with respect to the path of the needle whereby the stitch does not extend through said trimming material, and means to periodically shift said trimming material transversely across the path of the needle so the trimming material is secured to said fabric at spaced intervals by a plurality of spaced stitches between which the material is free to puff out to form a scalloped effect and position said trimming to conceal the row of stitches in the fabric.

12. A method of making a trimmed fabric which comprises feeding a fabric to a needle in position to receive a single row of stitches, folding a trimming material about its longitudinal axis into general U-shape with the edges folded inwardly to form at least two plies on each side, feeding the folded trimming with the fabric in a path offset with respect to the needle path, and periodically shifting said folded trimming across the needle path so as to cause spaced stitches of said row to penetrate said trimming to secure said trimming to said fabric, whereby the trimming is free to puff out between said spaced stitches to conceal said row of stitches and to produce a scalloped effect.

13. A method of making a trimmed fabric which comprises feeding a fabric to a needle in position to receive a single row of stitches, folding a trimming material about its longitudinal axis into general U-shape with the edges folded inwardly to form at least two plies on each side, feeding the folded trimming with the fabric in a path offset with respect to the needle path, and periodically shifting said folded trimming across the needle path so as to cause spaced stitches of said row to loop over said trimming and thereby secure it to said fabric, whereby the trimming is free to puff out between said spaced stitches to conceal said row of stitches and to produce a scalloped effect.

14. A method of making a trimmed fabric which comprises feeding a fabric to a needle in position to receive a single row of stitches, folding a trimming material about its longitudinal axis into general U-shape with the edges folded inwardly to form at least two plies on each side, feeding the folded trimming with the fabric in a path offset with respect to the needle path, the exposed ends of the edge folds of said trimming being adjacent the fabric, and periodically shifting said folded trimming across the needle path so as to cause spaced stitches of said row to penetrate said trimming to secure said trimming to said fabric, whereby the trimming is free to puff out between said spaced stitches to conceal said row of stitches and to produce a scalloped effect.

15. A method of making a trimmed fabric which comprises feeding a fabric to a needle in position to receive a single row of stitches, folding a trimming material about its longitudinal axis into general U-shape with the edges folded inwardly to form at least two plies on each side, feeding the folded trimming with the fabric in a path offset with respect to the needle path, the exposed ends of the edge folds of said trimming being adjacent the fabric, and periodically shifting said folded trimming across the needle path so as to cause spaced stitches of said row to loop over said trimming and thereby secure it to said fabric, whereby the trimming is free to puff out between said spaced stitches to conceal said row of stitches and to produce a scalloped effect.

CHARLES SEAMAN.